Dec. 29, 1959  J. U. WATERS  2,918,957
FRUIT SLICING MACHINE
Filed Jan. 13, 1958  2 Sheets-Sheet 1
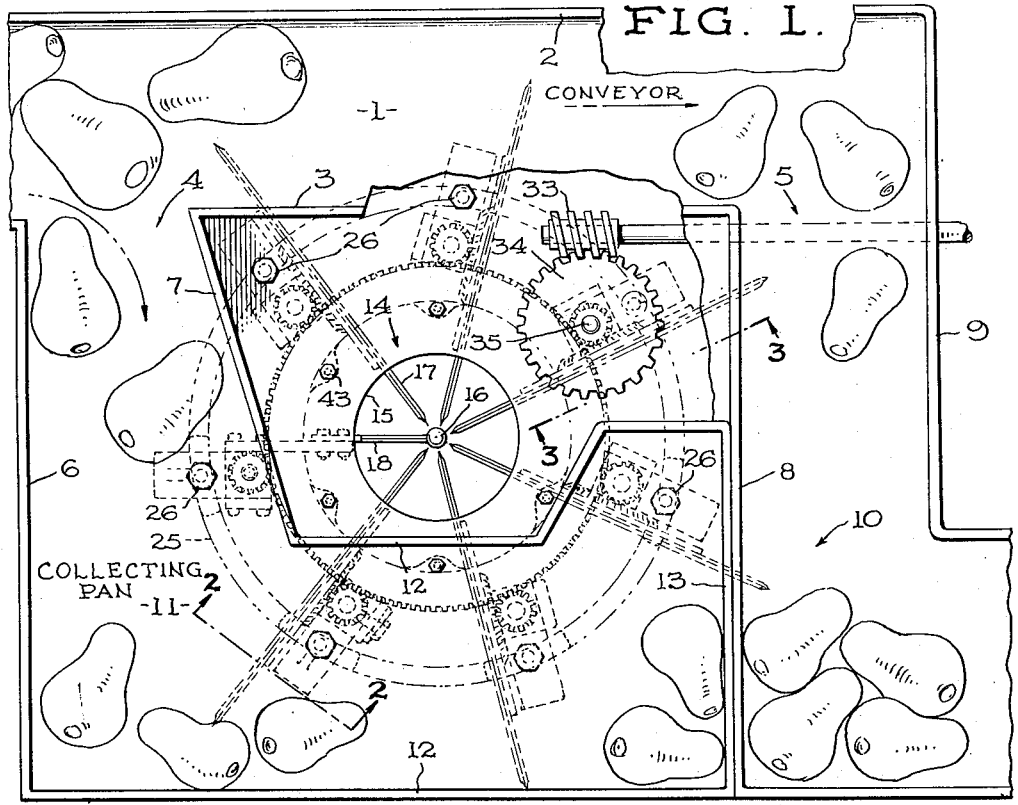
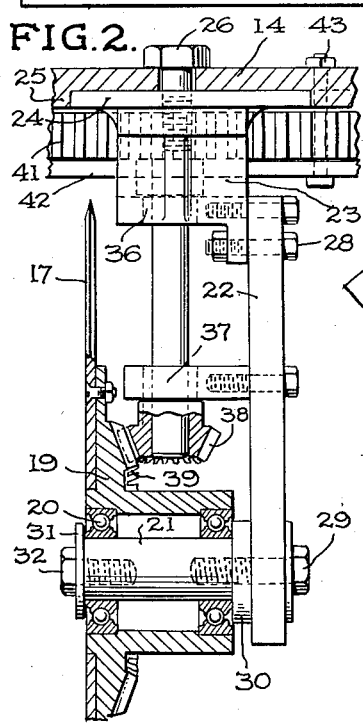
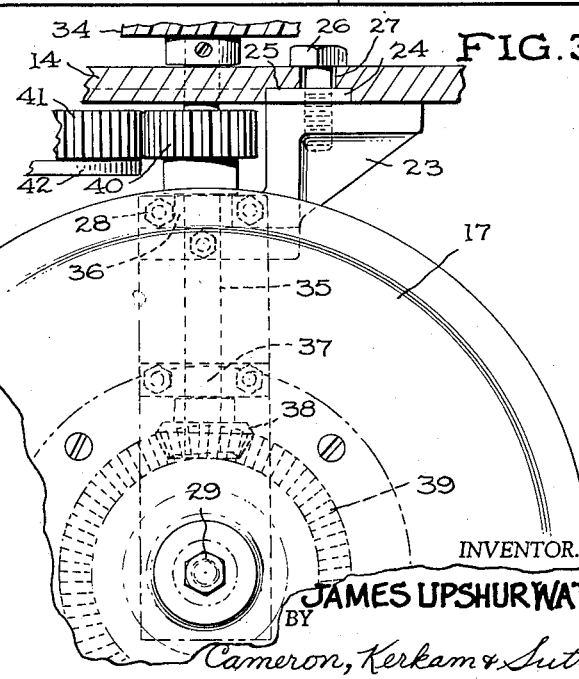
INVENTOR.
JAMES UPSHUR WATERS
BY Cameron, Kerkam & Sutton
ATTORNEYS Dec. 29, 1959   J. U. WATERS   2,918,957
FRUIT SLICING MACHINE
Filed Jan. 13, 1958   2 Sheets-Sheet 2
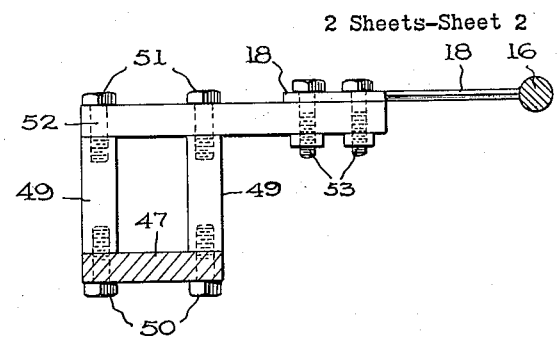
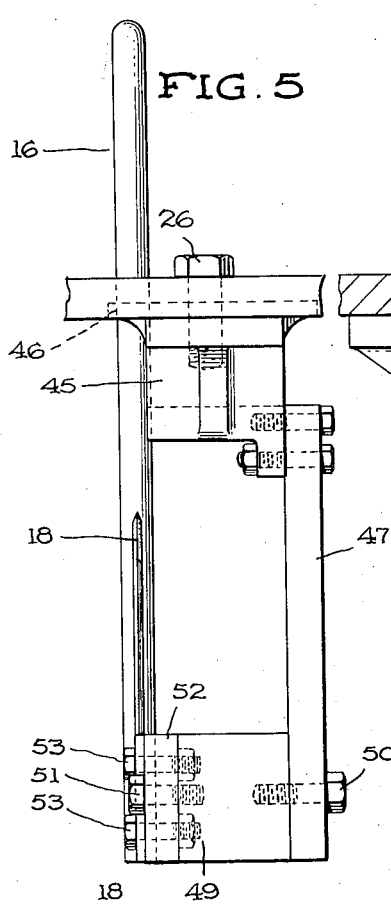
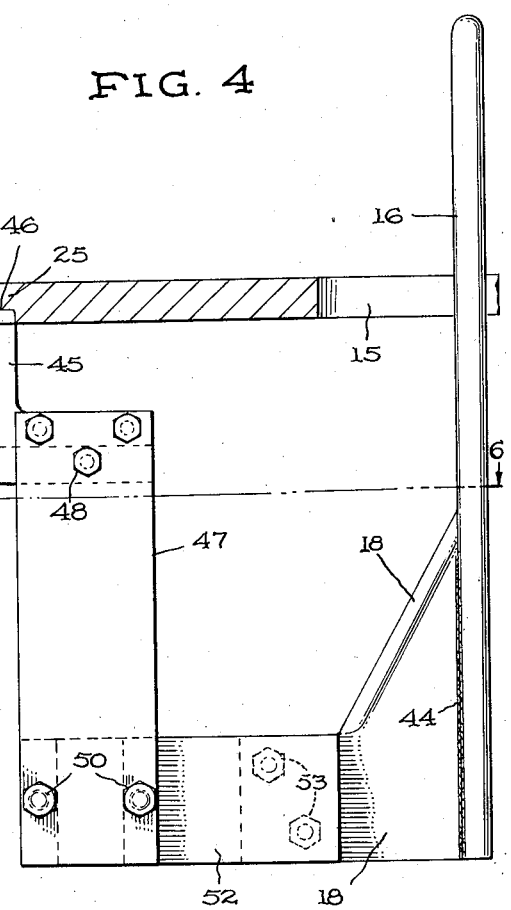
INVENTOR.
JAMES UPSHUR WATERS
BY
Cameron, Kerkam & Sutton
ATTORNEYS

United States Patent Office 2,918,957
Patented Dec. 29, 1959

2,918,957
FRUIT SLICING MACHINE

James Upshur Waters, San Jose, Calif., assignor to Hawaiian Pineapple Company, Limited, Honolulu, Hawaii, a corporation of Hawaii Application January 13, 1958, Serial No. 708,499

3 Claims. (Cl. 146—99)

This invention relates to an improved machine for slicing fruit which is useful especially in the production of canned sliced fruit but which can of course be used in any case where it is desired to produce sliced fruits or other comestibles.

By way of example, the invention will be described hereinafter with reference to a machine intended particularly for slicing pears, but it will be understood that slicing machines embodying the invention can be used for slicing other fruits or for that matter any other desired comestible. In the preparation of sliced fruit such as pears for canning, the necessary steps generally speaking include paring, coring and slicing. The pears are first pared in any suitable manner, preferably by any of the various paring machines available on the market and well known to those skilled in the art. They are then cored, preferably by any of various known coring devices which pierce the pared fruits (or if desired the unpared fruits) centrally or axially and remove therefrom cores in the form of small diameter cylinders throughout at least part of the axial length of the fruit. Such cored fruits are then sliced by machines which for present purposes are of a type in which the fruits are placed one by one on a spindle and then slid along the spindle through an assembly or gang of cutting knives arranged in planes radial to the axis of the spindle. In prior machines of this type, the spindle is usually vertical and a gang of rotating circular knife blades is employed, the direction of rotation of the knives being such that their cutting edges feed the fruits down the spindle as they cut through and slice the fruits.

The present invention relates to improvements in slicing machines of the type last described. Some of the difficulties heretofore experienced with such machines have been lack of uniformity of slices, undesirably low speed of operation, and damage to the cutting edges of the rotating knives. It has been found that such difficulties stem largely from the fact that the spindle does not remain fixed and rigid but is deflected out of its true position. A certain degree of flexibility of the spindle is practically unavoidable, since it must be small enough in diameter to pass through the core holes in the fruits. In the case of pears, for example, the diameter of the coring tube which removes the stem fibers, etc., may be of the order of $9/16''$ to $3/8''$, and obviously the spindle diameter must be slightly less, say $11/64''$ to $23/64''$. The spindle is usually supported only at its bottom end so that it projects freely through the gang of slicing knives and above them to receive the cored pears and permit them to slide down past the knives without obstruction. Thus the spindle is practically without lateral support, and since the cutting edges of the rotating knives must practically touch the surface of the spindle to insure slicing all the way through the fruit to the core hole, any deflection whatever of the spindle may bring it into contact with one or more of the knife edges.

The present invention provides improved means for mounting the spindle of a slicing machine of the above type which means provides lateral support for the spindle throughout a substantial proportion of its length without interfering with the desired slicing action. Thus the spindle, although still of the necessary small diameter and therefore inherently flexible, is nevertheless more rigid and is maintained substantially in its true position with the result that the operation of the machine can be speeded up without giving rise to the objectionable effects mentioned above, especially damage to the cutting knives.

One embodiment of the invention has been illustrated in the accompanying drawings, but it is to be expressly understood that said drawings are for purposes of illustration only and are not to be construed as a definition of the limits of the invention, reference being had to the appended claims for this purpose.

In the drawings,

Fig. 1 is a plan view of a machine embodying the invention;

Fig. 2 is a detailed view, partly in section, taken on the line 2—2 of Fig. 1;

Fig. 3 is a similar detailed view, partly in section, taken on the line 3—3 of Fig. 1; and Figs. 4, 5 and 6 are detailed views illustrating a combined knife and spindle support element according to the present invention.

In machines of the type under consideration, the pared and cored fruits are preferably delivered continuously to the machine by any suitable means such as a conventional conveyor. In Fig. 1, for example, fruit is delivered to a trough 1 which extends across the top of the machine and is bounded by sides 2 and 3 of sheet metal or like material. At the sides of the machine, gates 4 and 5 in the inner wall 3 of the trough permit the fruits to move laterally with respect to the trough down inclined ramps and between guide walls 6, 7 at the left-hand side and 8, 9 at the right-hand side of the machine, the fruits being received in suitable collecting pans 10 and 11 from which they are picked up one by one by the machine operator and placed on the slicing spindle as hereinafter described. Additional walls 12 and 13 may be suitably arranged to complete the collecting pans. It will be understood that the details just described constitute no part of the present invention and may be varied as desired.

Located underneath the collecting pans is a supporting table or the like 14 provided with an opening 15 (Figs. 1 and 4) through which the upper end of the spindle 16 projects to receive the fruit placed thereon by the operator. As the fruits slide down the spindle 16, they pass through a gang of radially arranged knives of any desired number, preferably a plurality of the usual rotating circular knife blades 17 together with one stationary or fixed knife blade 18 described more particularly below. It will be understood that these blades are disposed at the desired angles to provide a predetermined number of slices, here shown as seven in number. As explained hereinafter, the number of slices can be varied by either adding to or subtracting from the number of rotating knives and suitably adjusting the angular positions of the knives.

Figs. 2 and 3 show suitable mechanisms for mounting and driving the rotating circular knives, but again it will be understood that these details are not part of the present invention and may be varied as desired. In the form shown, each rotating knife 17 is mounted on a hub 19 rotating on ball bearings 20 carried by a spindle 21. This assembly is suspended beneath the table 14 by means of a suitable two-part bracket 22, 23, the bracket part 23 having an upper arcuate projection 24 which engages slidably in a circular groove 25 formed in the lower face of the table 14. The bracket part 23 can thus be shifted circumferentially around the table, and when properly located it is secured in position by suitable means such as a screw or bolt 26 passing through a hole 27 in the table 14 and being tapped into the projection 24 and bracket 23. It will be understood that by providing a series of holes 27, the brackets 23 and the knives 17 carried thereby can be placed in any of a desired number of radial positions which, as explained above, can be predetermined for different numbers of slices to be cut.

The bracket parts 22 depend from the bracket parts 23 and are secured thereto in any suitable manner, connecting bolts 28 being used for this purpose in the form shown. Each spindle 21 is carried at the lower end of one of the bracket parts 22 in any suitable manner. In the form shown, it is held on the lower end of the bracket by means of a bolt 29 passing through the bracket and tapped into one end of the spindle, the ball bearing races and hub 19 being secured in the hub 19 and on the spindle between a collar 30 at the end of the spindle next to the bracket 22 and a washer 31 which is held on the outer end of the spindle by a bolt 32.

In the form shown, each of the knives 17 is driven by suitable gearing including a worm 33 (Fig. 1) engaging and driving a worm wheel 34 mounted above the table 14, preferably on the upper end of one of a number of shafts 35 each of which drives one of the knife blades 17. This shaft 35 (Fig. 3) extends downwardly below the table through suitable bearings 36 in the upper bracket parts 23 and 37 secured to the lower bracket part 22. On the lower end of the shaft, beneath the bearing arm 37, is a bevel gear 38 meshing with a bevel gear 39 formed on the hub 19 of the knife 17. The shaft 35 also carries a pinion 40 just beneath the table 14 which meshes with and drives a ring gear 41 that is rotatably mounted beneath the table 14 by means of a suitable retaining element 42 secured to the table by means such as one or more bolts 43. At each of the other rotating knives, the ring gear 41 may be the driving element and the pinion 40 the driven element so that the other shafts corresponding to the shaft 35 need not extend upwardly through the table 14 (see Fig. 2). Thus it will be seen that the worm gear 34 above the table acts to drive the ring gear 41 below the table and furnishes a common source of driving power for a series of pinions 40, one for each rotating knife 17.

Referring now more particularly to Figs. 4, 5 and 6, one of the knife elements as stated above is stationary instead of rotating and this stationary knife element provides means for mounting the spindle 16 and supporting it laterally throughout a substantial portion of its length. As shown particularly in Fig. 6, the stationary knife element 18 comprises a plate-like member having an inclined knife edge the upper end of which terminates at the surface of the spindle, the cutting edge extending downwardly and outwardly from the spindle in a radial plane. Preferably the plate element 18 extends vertically from the upper corner where the cutting edge begins to a lower edge flush with the lower end of the spindle, and the vertical edge 44 of plate 18 is secured rigidly to the spindle by suitable means such as welding. As shown in Fig. 4, this rigidly supported length of the spindle comprises most of that portion of the spindle which is subjected to lateral forces during the cutting action, i.e., the spindle is supported up to a point level with or above the height at which the rotating knives engage the fruit, so that deflection of the spindle out of its true position is substantially prevented. The fruits passing down the spindle are of course divided by the knife edge 18, the sections passing on both sides of the relatively thin blade element 18 in the same manner that they pass on the opposite sides of each of the rotating knife blades 17, so that the slicing action is just the same as if all of the blades were in rotation.

It will be understood that any suitable means may be provided for mounting the combined spindle and blade assembly 16, 18 in its proper position with the spindle centered in the opening 15. It will also be understood that arrangements are preferably made for shifting the radial position of this assembly in case it is desired to change the number of slices into which the fruit is cut. Shifting of the edge 18 is necessary for this purpose in an arrangement such as disclosed herein where one of the shafts 35 must remain fixed because it carries the worm wheel 34 which must mesh with the worm 33. It will be understood that the worm and worm wheel or other suitable means can be arranged to drive the ring gear 41 independently of any of the rotating knives 17, in which case knife edge 18 may be fixed if desired and the rotating knives shifted with respect thereto.

In the form shown, the spindle-knife assembly is supported by a two-part bracket arrangement essentially similar to that described above for the rotating knives. The upper bracket part 45 has an arcuate projection 46 which engages slidably in the circular groove 25 described above, the bracket being secured in its desired position by means of one of the bolts 26 described above. The lower bracket part 47 is connected to the part 45 by bolts 48.

It is desirable that the fixed knife edge have the same circumferential spacing with respect to its bolt 26 as the rotating knife blades 17 have with respect to their bolts 26, in order that all the bolts 26 may be located at equiangular positions for any desired number of slices to be cut. Accordingly the fixed blade element 18 is mounted on the bracket part 47 by means of spacers 49 extending laterally in a manner similar to the hubs 19 and secured to the bracket 47 by means of bolts 50. Secured to the outer ends of these spacers, as by means of bolts 51, is a support member 52 which extends radially inward and carries the spindle-blade assembly 16, 18 in any suitable way. As shown, the knife plate 18 is mounted thereon by means of bolts 53. The extent of the spacers 49 from the bracket 47 is such that the fixed knife edge is spaced circumferentially with regard to its bolt 26 by the same amount as each of the rotating knife blades 17 is spaced from its supporting bolt 26.

The operation of the machine will be clear from the foregoing description. The chief advantages of the invention flow from the fact that the spindle has rigid lateral support throughout all or substantially all of its vertical extent that is subjected to lateral forces when fruit passes through the machine and is sliced. Thus the operation of the machine may be speeded up while at the same time uniformity of slicing is maintained and in particular damage to the cutting edges of the rapidly rotating knife blades is largely prevented. These desirable results are obtained by a machine which is characterized by simplicity and economy of design, construction, upkeep, and operation.

While only one embodiment of the invention has been described and illustrated in the drawings, it will be understood that the invention is not restricted to this embodiment nor to the various details of construction and assembly shown by way of example. Reference should be had to the appended claims for a definition of the limits of the invention.

What is claimed is:

1. A machine for slicing cored fruits and like comestibles comprising a spindle along which the individual cored fruits are moved for slicing, and a gang of disk knives arranged in planes substantially radial to the spindle axis and angularly spaced around the spindle for dividing the moving fruits into sections, the direction of movement of the cutting edges of said disks as they slice the fruits being the same as the direction of movement of the fruits along the spindle, and a cutting element comprising a fixed plate-like member of generally triangular shape having a cutting edge against which the fruits move and being connected edgewise to and supporting the spindle throughout substantially that portion of its length in which the cutting action of said disk knives takes place, said spindle extending freely beyond the upper corner of said plate-like member.

2. A machine for slicing cored fruits and like comestibles comprising a table having an opening, a spindle having a free end projecting upwardly through said opening and down which the individual cored fruits slide, and a gang of disk knives depending from the table and arranged in vertical planes substantially radial to the spindle and angularly spaced around it for dividing the downwardly sliding fruits into sections, means on said table for rotating said knives, and a cutting element comprising a plate-like member having an upper knife edge and also a vertical edge connected to and supporting the spindle throughout a substantial portion of its length from a point adjacent its lower end beneath said knives to a point above the cutting zone in which said knives engage the fruits.

3. A machine as defined in claim 2, said table having a circular track thereon concentric with said spindle, each of said disk knives and said plate knife member having means circumferentially adjustable in said trackway, and means for anchoring each of said adjustable means at a desired position in said trackway to fix said knives in said angularly spaced relation.

References Cited in the file of this patent
UNITED STATES PATENTS

| | | |
|---|---|---|
| 1,389,270 | Pratt | Aug. 30, 1921 |
| 1,758,621 | Reynolds | May 13, 1930 |
| 2,496,637 | Pease | Feb. 7, 1950 |